(12) United States Patent
Adas et al.

(10) Patent No.: US 6,577,856 B1
(45) Date of Patent: Jun. 10, 2003

(54) SYSTEM AND METHOD FOR PERFORMING POWER MANAGEMENT WITHOUT LOSING DATA, CONNECTIVITY OR REACHABILITY

(75) Inventors: Abdelnaser M. Adas, Costa Mesa, CA (US); Joel D. Peshkin, Irvine, CA (US); Shahram Famorzadeh, Atlanta, GA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/579,343

(22) Filed: May 25, 2000

(51) Int. Cl.$^7$ .................................................. H04B 1/16
(52) U.S. Cl. ........................ 455/343; 455/574; 370/311
(58) Field of Search ................................ 455/574, 343, 455/557, 13.4, 38.1; 370/311

(56) References Cited

U.S. PATENT DOCUMENTS

| | | | |
|---|---|---|---|
| 5,481,259 A | * | 1/1996 | Bane ..................... 340/870.03 |
| 5,790,946 A | * | 8/1998 | Rotzoll |
| 5,991,635 A | * | 11/1999 | Dent et al. |
| 6,009,319 A | * | 12/1999 | Khullar et al. |
| 6,028,855 A | * | 2/2000 | Hirsch |

* cited by examiner

Primary Examiner—Nguyen T. Vo
Assistant Examiner—Nghi H. Ly

(57) ABSTRACT

A system and method for performing power management in a communication system without losing data is disclosed. The G.Lite system is an exemplary system suitable for implementing the present invention because it includes at least one operational state and an idle state in which no data is transmitted. The G.Lite standard defines ATU states. The defined states are full on state L0, low power state L1 and idle state L3. In L0 state, the ADSL link is fully operational at full data rate. In L1 state, the ADSL link is fully operational at a lower data rate. In L3 state, no signal is transmitted. Because no signal is transmitted, no idle cells are transmitted. This will result in losing the cell delineation and ATM link connectivity. Therefore, when data is received for an ATU in L3 state, data cells may be lost. The present invention solves the problem of lost data cells by allowing interaction between the control path and the data path by requesting that the micro-controller be interrupted when a data cell arrives for an ATU-C that is in L3 state. When a data cell arrives for an ATU-C in L3 state, the micro-controller is interrupted. The micro-controller then ensures that a sufficient number of idle cells are sent to the ATU-C prior to any data cells being sent to the ATU-C.

11 Claims, 5 Drawing Sheets

SYSTEM AND METHOD FOR PERFORMING POWER MANAGEMENT WITHOUT LOSING DATA, CONNECTIVITY OR REACHABILITY

FIELD OF THE INVENTION

This invention relates generally to communication systems and, more particularly, to a method for performing power management without losing data, connectivity or reachability.

BACKGROUND OF THE INVENTION

Asynchronous Transfer Mode (ATM) is a cell-oriented switching and multiplexing technology that uses fixed length cells to carry different types of traffic. Digital Subscriber Line (DSL) technology and its variations use ATM to bring high-bandwidth information to homes and businesses over ordinary copper telephone lines. Variations of DSL technology include: Asymmetric Digital Subscriber Line (ADSL), High bit-rate Digital Subscriber Line (HDSL) and Rate-Adaptive Digital Subscriber Line (RADSL).

ADSL is used for transmitting digital information at high bandwidths using existing phone lines. ADSL technology is asymmetric because most of the channel is used for transmitting information to the user while only a small part of the channel is used for receiving information from the user. ADSL accommodates analog (voice) information simultaneously with the digital transmission of information. ADSL is generally offered at data rates from 512 Kbps to about 6 Mbps.

Most DSL technologies require the installation of a signal splitter at a home or business which requires a visit by the phone company, and therefore an additional expense. G.Lite (also known as DSL Lite, splitterless ADSL and Universal ADSL) is a slower ADSL which splits the line remotely for the user at the telephone company and does not require splitting the line at the user end. G.Lite has initially been approved as a standard by the Telecommunication standardization section of the International Telecommunication Union (ITU-T). The ITU-T standard, "Transmission Systems and Media, Splitterless Asymmetric Digital Subscriber Line (ADSL) Transceivers", Draft G.992.2, Oct. 12, 1998, (hereafter, "G.Lite standard") is incorporated by reference herein.

The G.Lite standard specifies power management by defining states for the ADSL Terminal Units (ATUs). The states include an idle state in which no signal is transmitted on the link between the Central Office ATU (ATU-C) and remote ATUs (ATU-Rs). To save power, any ATU can initiate the transition to the idle state. In non-idle states, data is transmitted using ATM cells over the ADSL link. However, in the idle state, no data (including idle cells) are transmitted over the ADSL link. When a cell that is coming from the network needs to go to an ATU-C that is in an idle state, that cell will be dropped because the ATU-C is in an idle state and there is currently no mechanism for waking up the ATU-C when data is coming from the network. Thus, a need exists for a system that allows for G.Lite power management (e.g., an idle state), yet does not lose ATM cells.

SUMMARY OF THE INVENTION

In accordance with the present invention, a communication system allows a device to operate in an idle state without losing data or connectivity.

In accordance with other aspects of the invention, the communication system includes at least two communication devices which are capable of operating in an operational state. At least one of the communication devices is also capable of operating in an idle state. Data is only transmitted between the communication devices when the communication devices are in an operational state.

In accordance with still other aspects of the invention, before a communication device goes to idle state, a request is made for an interruption when data destined for the idle communication device arrives. When data arrives for a communication device in an idle state, the requested interrupt occurs. A sufficient amount of idle cells are then sent to the communication device to ensure that the device transitions from the idle state to an operational state prior to transmitting data.

In accordance with yet other aspects of the invention, the communication system is a G.Lite system. In the G.Lite system, a micro-controller notifies the ATM layer or the Transmission Convergence (TC) sub-layer to interrupt the micro-controller when a cell destined for the ATU-C in idle state arrives. When data destined for the ATU-C in idle state arrives, the micro-controller is interrupted as requested. The micro-controller then wakes up the ATU-C (e.g., instructs the ATU-C to go to an operational state). The ATU-C wakes up the ATU-R. The ATU-C then sends a sufficient number of idle cells to allow the TC layer to sync and to establish connectivity to the ATM physical layer before attempting to send the arrived data cells.

BRIEF DESCRIPTION OF THE DRAWINGS

The subject invention will hereinafter be described in conjunction with the appended drawing figures, wherein like numerals denote like elements, and.

DETAILED DESCRIPTION OF A PREFERRED EMBODIMENT

Figure 1:
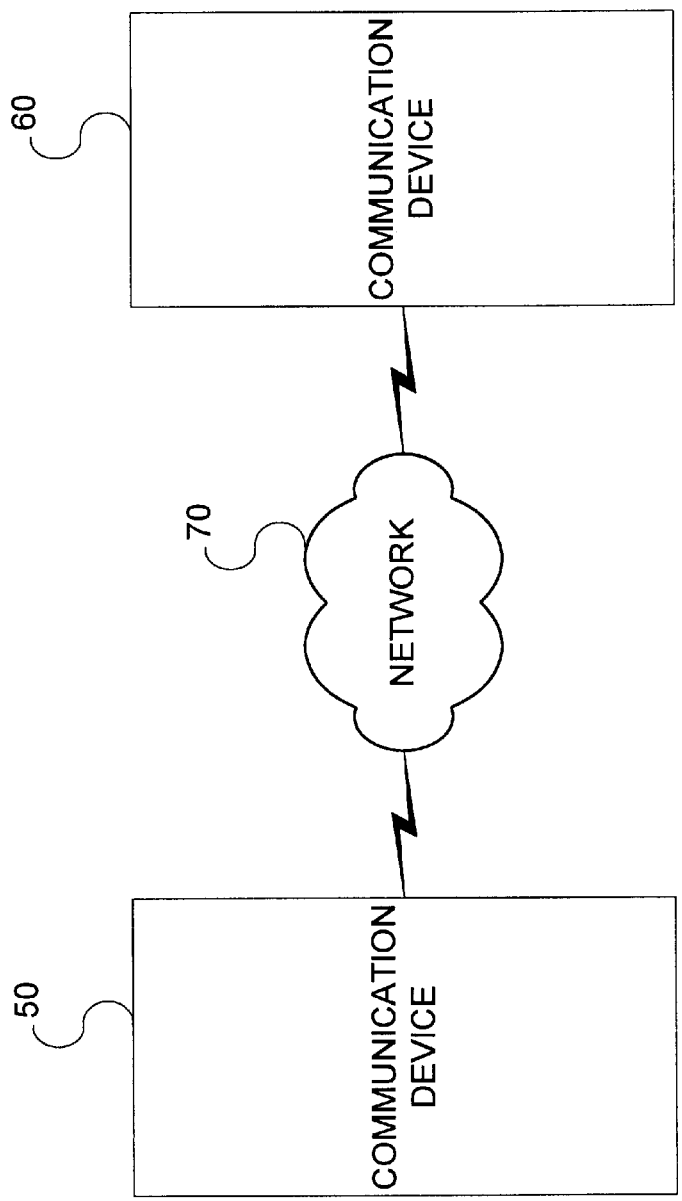
FIG. 1 is a block diagram of an exemplary communication system suitable for implementing the present invention.

FIG. 1 is a high-level block diagram of a communications system suitable for implementing the present invention. The communication system includes at least two communication devices 50, 60 that communicate with each other over a network 70. It will be appreciated that the network 70 can be any one of a variety of types of networks, for example the Internet, a local area network (LAN) or a wide area network (WAN). Data is transmitted between the communication devices 50, 60. The protocol between the communication devices includes an idle state in which no data is transmitted. The idle state provides for power management. In a preferred embodiment, the communications system is a high speed data communications system in which the data path and the control path are separate. An actual embodiment of the present invention is a G.Lite system. The invention is described in detail herein with reference to a G.Lite system.

The G.Lite standard specifies power management with a set of power management states for the ADSL link. The power management definition defines the use of the Embedded Operations Channel (EOC) for coordinating power management between the ADSL Terminal Units (ATUs). ADSL line states are defined to allow an ATU to enter a low power state without totally disconnecting the link. The defined link states are stable states and are generally not expected to be transitory. The link states as defined by the G.Lite standard are shown below in Table I:

TABLE I

G.Lite Link States

| State | Name | Support | Description |
|-------|------|---------|-------------|
| L0 | Full On | Mandatory | The ADSL link is fully functional. |
| L1 | Low Power | Optional | Full L0 state functionality is maintained, but at a lower data rate. |
| L2 | | | Reserved for use by the ITU-T. |
| L3 | Idle | Mandatory | There is no signal transmitted at the ATU-C and the ATU-R reference points. The ATU may be powered or unpowered in L3 state. |
| L4–L127 | | | Reserved for use by the ITU-T. |
| L128–L255 | | | Reserved for vendor specific implementations. |

Figure 2:
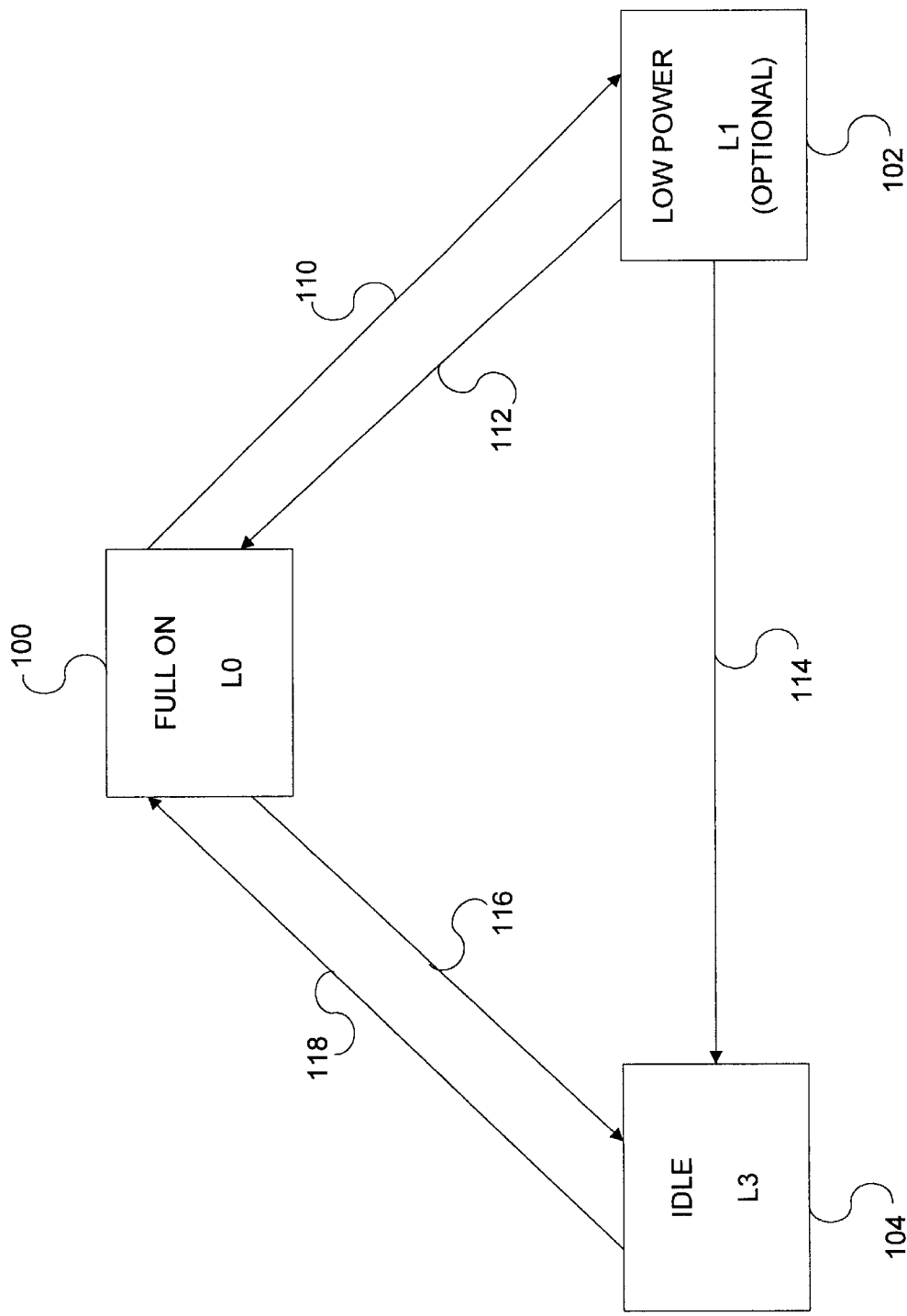
FIG. 2 is a state transition diagram for an exemplary communication system.

FIG. 2 is a state transition diagram. The state transition diagram is described in the context of a G.Lite system. However, it will be appreciated that the state transition diagram illustrated and described herein is applicable to any communication system with at least one operational state and an idle state. The ATU-C and ATU-R coordinate transitions between power states using procedures defined in the G.Lite standard, for example, EOC handshake, exchange entry procedure or fast retrain. Following completion of each of the link transition procedures, the ATU-R updates the link state data register if the register does not conform to the current ADSL link state.

The EOC handshake is used for power management coordination between the ATUs. The EOC handshake ends in either a successful or unsuccessful result. If the result is successful, it is a grant event which is used to enable a power management state transition. If the EOC handshake ends in an unsuccessful result, a state transition is not triggered and the power management state is unchanged. The EOC handshake procedure includes a sequence of EOC commands. If any of the EOC command, read or write protocols used in the EOC handshake detects an EOC protocol error condition, the EOC handshake terminates and the result is unsuccessful.

A transition from L0 (full on) state 100 to L0 (full on) state 100 can be caused by any of the following events: (1) a change in line conditions which requires initialization at an ATU-R or ATU-C; (2) a change in line conditions which requires fast retrain at an ATU-R or ATU-C; and (3) an ATU-C or ATU-R is commanded to change link via an initialization procedure. The initialization procedure proceeds upon the detection of initialization signals by an ATU-C or ATU-R. The fast retrain procedure proceeds upon the detection of fast retrain signals by ATU-C or ATU-R. The fast retrain procedure is defined to adapt transmission characteristics to changing line conditions based on the concept of stored profiles.

A transition 110 from L0 state 100 to L1 state 102 is a grant (i.e., a negotiated event) to move from full on to low power. The ATU-C or ATU-R may initiate the transition 110 from L0 (full on) state 100 to L1 (low power) state 102 by using the EOC handshake. Upon successful termination of the EOC handshake, an exchange entry procedure is used to adjust the parameters provided in the exchange portion of the initialization procedure (e.g., data rate, number of tones and power per tone). The exchange entry procedure reuses states signals and rules for determining the next state using the following steps:

1. After successful termination of the EOC handshake procedure, the ATU-R transmits a R-QUIET-PM which is defined as no transmitted signal onto the ATU-R interface. The ATU-R maintains loop timing and symbol timing during the R-QUIET-PM signal.
2. The ATU-C detects the R-QUIET-PM and responds by sending a C-REVERB4 within N1 symbols on a symbol boundary. N1 is an implementation specific number of symbols and is defined to be sufficiently small so that loss of signal defect does not occur at the ATU-C. Alternatively, the ATU-C implementation can include a method for blocking the loss signal defect during the exchange entry procedure.
3. The ATU-R detects the C-REVERB4 and responds by sending a R-REVERB4 within a specified number of symbols which is sufficiently small so that loss of signal defect does not occur, for example, 40.

The ATU-C or ATU-R can initiate a transition 112 from L1 (low power) state 102 to L0 (full on) state 100 by using the EOC handshake. Upon successful termination of the EOC handshake, the ATU-R begins the fast retrain procedure by starting to transmit an R-RECOV signal. In addition, either ATU may start the initialization procedure or retrain procedure to move to L0 (full on) state 100. Upon successful termination of the procedure, the ADSL link state is L0 (full on) state 100. However, if the initialization or fast retrain procedures cannot be successfully completed (e.g., due to repeated error conditions), a transition 114 to power management (i.e., idle) state L3 104 may be initiated.

Either the ATU-C or ATU-R can initiate a transition 116 from L0 state 100 to L3 state 104 or a transition 114 from L1 state 102 to L3 state 104 by using the EOC handshake. Upon successful initiation of the EOC handshake, the ATU-R will stop transmitting. Upon detecting that the ATU-R has stopped transmitting, the ATU-C will also stop transmitting.

Either ATU can start the initialization procedure to transition 118 from L3 (idle) state 104 to L0 (full on) state 100. Alternatively, the ATUs can initiate a fast retrain procedure. Upon successful termination of the procedures, the ADSL link state is L0 state 100. If the initialization or fast retrain procedures cannot be successfully completed for some reason (e.g., no response to training signals), the power management state is unchanged (i.e., remains in L3 state 104). In the current G.Lite standard, as illustrated in FIG. 2, the transition from the L3 (idle) state 104 is always back to the L0 (full on) state 100. However, it will be appreciated that other embodiments can transition from the L3 (idle) state 104 to the L1 (low power) 102 state.

In non-idle states (e.g., full on state L0 100 and low power state L1 102), data is transmitted using ATM cells over the ADSL link. However, in an idle state (e.g., L3 state 104), no data (including idle cells) are transmitted over the ADSL link. In a traditional G.Lite system, this will result in losing cell delineation and will affect the reachability of ATU-Rs that are in an idle state. When a cell that is coming from the network needs to go to an ATU-C that is in an idle state, that cell will be dropped because the ATU-C is in an idle state and there is currently no mechanism for waking up the ATU-C when data is coming from the network because in high-speed data communications the data path and the control path are separate. The present invention solves the loss of ATM cells problem as described below.

Figure 3:
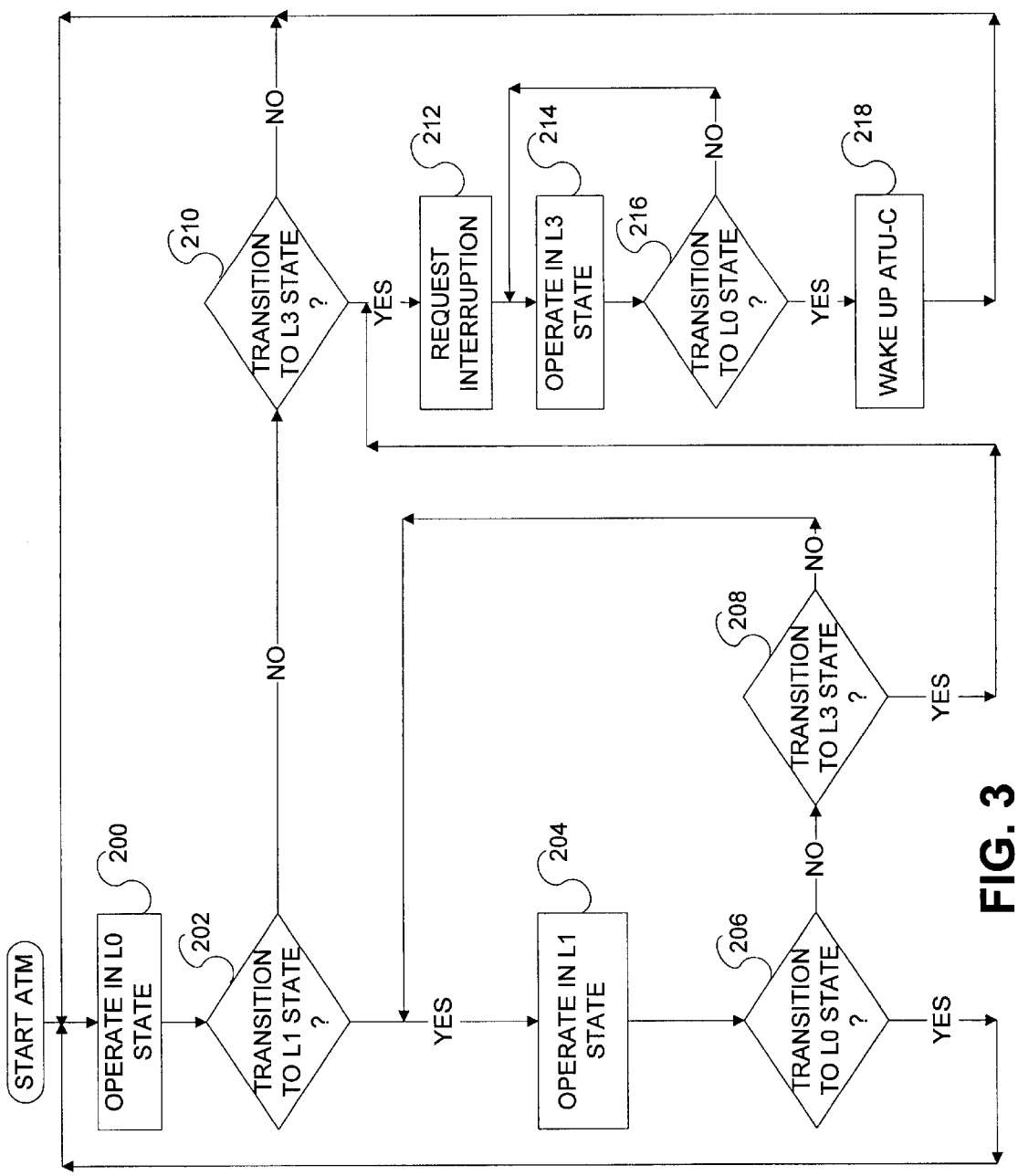
FIG. 3 is a flow diagram illustrating exemplary logic for performing state transitions in accordance with the present invention.

FIG. 3 is a flow diagram illustrating exemplary logic for performing state transitions as shown in FIG. 2 in accordance with the present invention. The logic described herein is described with reference to a G.Lite system. It will be appreciated that the logic described herein is applicable to any communication system that includes at least one operational state and an idle state. The ATM layer resides on top of the physical layer. Upon initialization, ADSL operates in the L0 (full on) state (block 200). In L0 state, the ADSL link is fully functional and data (i.e., ATM cells) are transmitted at full data rate. Operation continues in L0 state until a state transition is initiated by one of the ATUs. In G.Lite, a transition can be made from L0 state to either an L1 (low power) state or an L3 (idle) state.

If a transition from L0 state to L1 state is initiated (yes in decision block 202), a transition from L0 state to L1 state occurs and the link commences to operate in an L1 state (block 204). In L1 state, the ADSL link maintains the same functionality as the L0 state but data are transmitted at a lower rate. Since L1 (low power) state maintains the same functionality as L0 (full on) state, there is minimal risk of lost cells and no special logic is needed (i.e., traditional processing occurs). While operating in L1 state, a transition to L0 state (yes in decision block 206) or L3 state (yes in decision block 208) may occur. If there is a transition from L1 state to L0 state (yes in decision block 206), processing returns to block 200 where a transition to L0 state occurs and the ADSL link commences operating in L0 sate.

As described above, there can be a transition to idle state L3 from full on state L0 (yes in decision block 210) or from low power state L1 (yes in decision block 208). If a transition to L3 state is to occur (yes in decision block 208 or 210), the logic of FIG. 3 moves to block 212. As described above, in traditional systems, a loss of ATM cells can occur when transitioning from idle state L3 to an operational state. To overcome the problem of lost ATM cells, the present invention requests an interruption when a data cell arrives for an ATU-C that is in L3 state. In a preferred embodiment, when an ATU-C goes to L3 state, the micro-controller instructs the ATM layer or the Transmission Convergence (TC) sub-layer to interrupt the micro-controller when a data cell arrives. The link then goes into L3 (idle) state in block 214.

L3 state is an idle state in which no signal is transmitted on the link between ATU-C and ATU-R. In L3 state, no data (not even idle cells) are transmitted over the ADSL link. This results in losing cell delineation and affects the reachability of the ATU-Rs that are in L3 state. In existing systems, when a cell that is coming from the network needs to go to an ATU-C that is in L3 state, that cell will be dropped because there is no mechanism in place to wake the ATU-C when the data is coming from the network because in high-speed data communications the control path and data path are separate. When a data cell is received (yes in decision block 216), the link transitions from L3 state to L0 state. In existing systems, this transition would cause the loss of data cells because in high-speed communications, the data path and control path are separate. In the present invention, in order to prevent the loss of ATM cells, the logic moves to block 218 to wake up the ATU-C. This is accomplished by sending enough idle cells to allow the TC sub-layer to sync before sending out the arrived data cell. If a sufficient number of idle cells are not sent, some data cells may be lost. The lost data cells could be carrying signaling messages for establishing a new connection. If signaling cells are dropped, the connection establishment may fail. Therefore, when the micro-controller informs the entity that is implementing the TC or the ATM layer that the ATU-C is awake and ready, the TC will send enough idle cells to allow the TC layer protocols to sync before sending the data cell. In a preferred embodiment the number of idle cells sent is between 10 and 15. After sending a sufficient number of idle cells to wake up the ATU-C, the logic moves to block 200 where the link is transitioned to operate in an L0 state.

Figure 4:
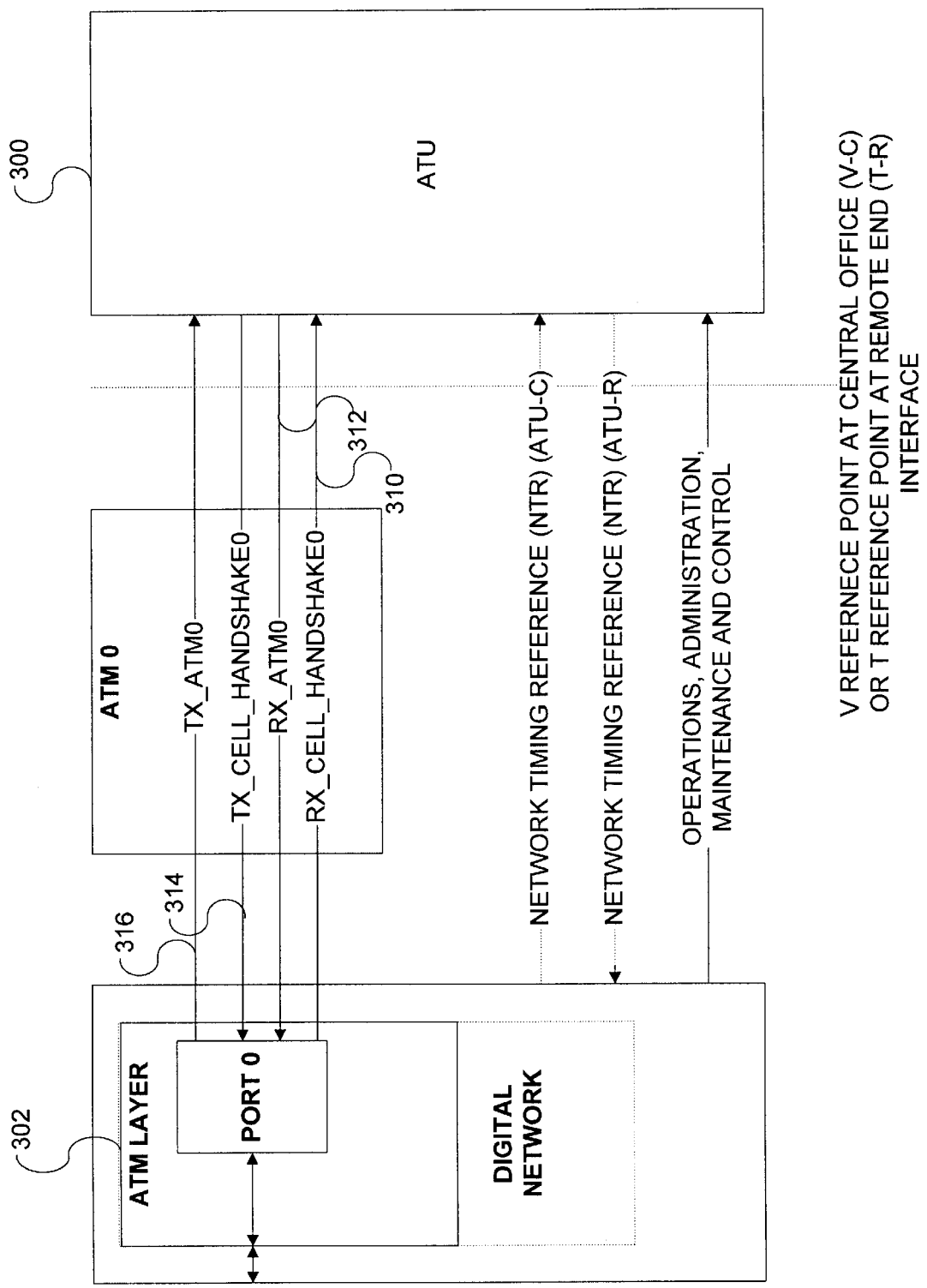
FIG. 4 is a block diagram illustrating the functional data interfaces between the physical layer ATU and the ATM layer.

FIG. 4 illustrates the functional data interfaces at the ADSL Terminal Unit (ATU) 300 for Asynchronous Transfer Mode (ATM). Flow control functionality available on the interface allows the ATU 300 (i.e., the physical layer) to control the cell flow to and from the ATM layer 302. This functionality is represented by Tx_Cell_Handshake 314 and Rx_Cell_Handshake 310. A cell 316 can be transferred from ATM layer 302 to the physical layer 300 only after the ATU 300 has activated the Tx_Cell_Handshake 314. Similarly, a cell 312 can only be transferred from the physical layer 300 to the ATM layer 302 after the Rx_Cell_Handshake 310.

Figure 5:
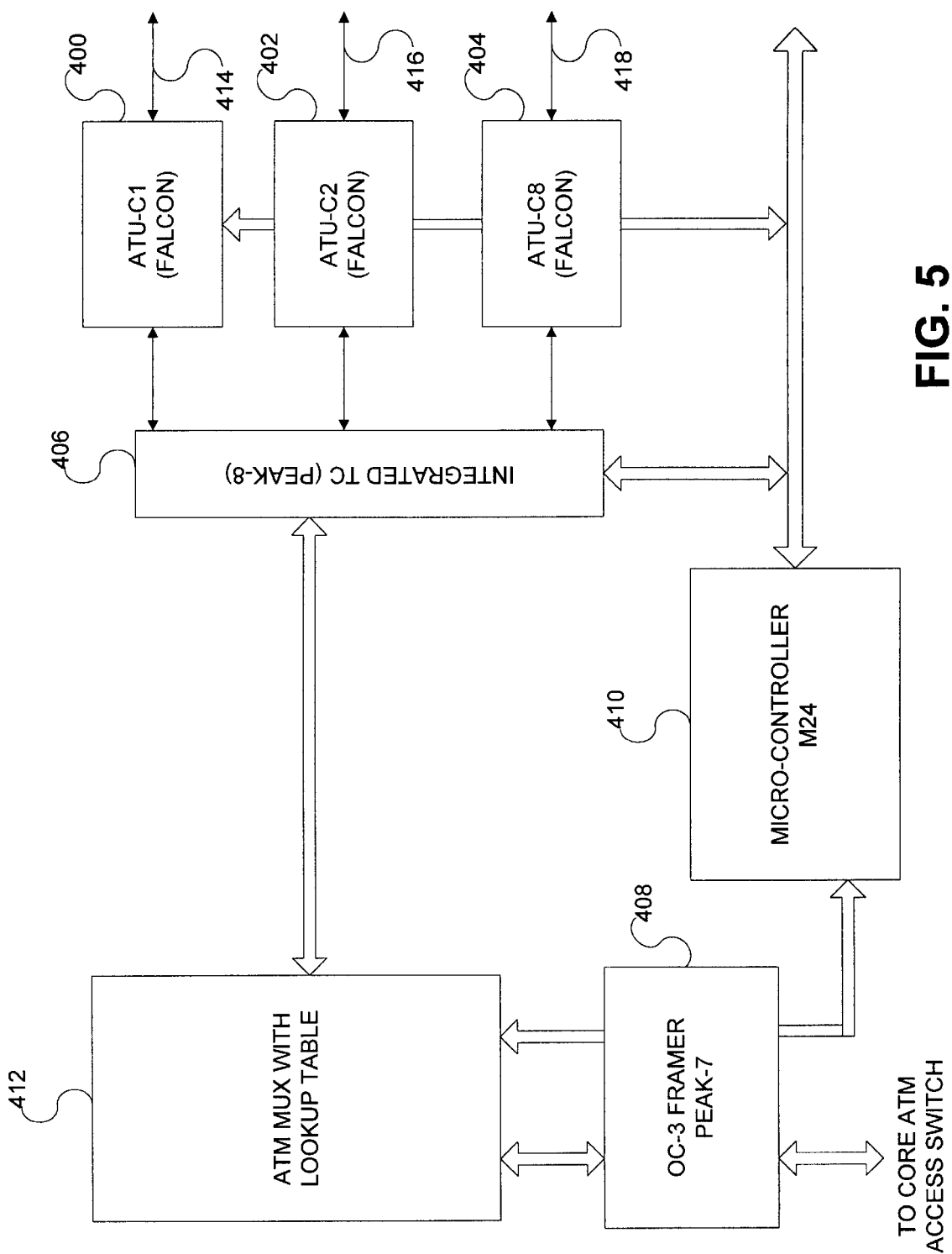
FIG. 5 is a block diagram of a DSLAM configuration suitable for implementing the present invention.

FIG. 5 illustrates the use of the present invention implemented in a Virtual Path (VP)-Cross connect DSLAM configuration. To interconnect multiple DSL users to a high-speed backbone network, the telephone company uses a Digital Subscriber Line Access Multiplexer (DSLAM). Typically, the DSLAM connects to an ATM network that can aggregate data transmission at high data rates (e.g., gigabyte data rates). At the other end of each transmission, a DSLAM demultiplexes the signals and forwards them to appropriate individual DSL connections. FIG. 5 is a block diagram illustrating a VP-Cross connect Digital Subscriber Line Access Multiplexer (DSLAM) configuration. The DSLAM configuration shown in FIG. 5 includes a plurality of ATU-Cs (e.g., Falcons) 400, 402, 404, an integrated TC (e.g., Peak-8) 406, a framer (e.g., Peak-7) 408, a Micro-controller (e.g., M24) 410 and an ATM MUX 412. The Peak-8 406 is a device that implements the Transmission Convergence sub-layer for a plurality of ATU-Cs. In a preferred embodiment there are eight ATU-Cs. The Peak-7 408 is an OC-3 framer that will be used for an up-link to the ATM Network. The ATM MUX 412 is used to Multiplex cells from the ATU-Cs 400, 402, 404 to the network and de-multiplex from the network to the ATU-Cs.

In the configuration shown in FIG. 5, there are Permanent Virtual Connections (PVCs) 414, 416, 418 between the client (e.g., an ATU-R) and the ATM switch through the VP-cross connect. A PVC has an associated Virtual Path Identifier /Virtual Connection Identifier (VPI/VCI) value. For example, the PVC 414 that goes through the ATU-C1 400 may have a VPI/VCI value of 1/10. If the PVC 414 has been idle for a period of time, ATU-C1 400 may have gone to L3 (idle) state. The M24 micro-controller 410 informs the ATM MUX 412 that when a cell with a VPI/VCI value of 1/10 arrives, the ATM MUX 412 should interrupt the M24 micro-controller 410. When the M24 micro-controller 410 is interrupted because a cell with a VPI/VCI value of 1/10 has arrived, the M24 micro-controller 410 wakes the ATU-C1 400. When ATU-C1 400 is up and running and Peak-8 406 has sent enough idle cells to sync with the other end TC sub-layer, the M24 micro-controller 410 instructs the ATM MUX 412 to send the data cell.

While a specific embodiment of this invention has been described above, those skilled in the art will readily appreciate that many modifications are possible in the specific embodiment, without materially departing from the novel teachings and advantages of this invention. Accordingly, all such modifications are intended to be included within the scope of this invention, as defined in the following claims.

Having thus described the invention, what is claimed is:

1. A communication system for performing power management, said system comprising:
    a first communication device, wherein said first communication device is capable of operating in an operational state;
    a second communication device, wherein said second communication device is capable of operating in the operational state and wherein said second communication device is capable of operating in an idle state;
    a network that facilitates data communication between said first communications device and said second communications device; and
    a monitoring device, wherein said monitoring device ensures that said second communication device transitions from the idle state to the operational state to receive data in the second communication device, the monitoring device requesting an interrupt from a communications sub-layer upon an arrival in the communications sub-layer of a data cell destined for the second communications device.

2. The communication system of claim 1, wherein said monitoring device is a micro-controller.

3. The communication system of claim 1, wherein said communication system is a G.Lite system.

4. A method for performing power management in a communications system, said method comprising:
    operating the communication system with at least one communication device in a first operational state; and
    in response to a request to transition an identified one of said at least one communications devices to an idle state, employing a monitoring device to request a wake-up message from a communications sub-layer when it is time to transition the at least one communications devices from the idle state to the first operational state.

5. The method of claim 4, wherein said first operational state is a full on state.

6. The method of claim 4, wherein said first operational state is a low power state.

7. The method of claim 4, wherein said wake-up message request is transmitted to a micro-controller.

8. The method of claim 4, wherein the communication system is a G.Lite system.

9. The method of claim 4, further comprising:
    receiving data in the communications sub-layer that is destined for an identified one of the at least one communications devices;
    waking up the identified one of the at least one communications devices;
    transitioning the identified one of the at least one communications devices to the first operational state.

10. The method of claim 9, wherein said waking up the identified one of the at least one communications devices comprises sending a plurality of idle messages.

11. The method of claim 10, wherein said plurality of idle messages is about 10–15 idle messages.

* * * * *